United States Patent [19]

Tsuji

[11] Patent Number: 4,580,878
[45] Date of Patent: Apr. 8, 1986

[54] PICTURE TAKING OPTICAL SYSTEM FOR COLOR VIDEO CAMERA

[75] Inventor: Sadahiko Tsuji, Kanagawa, Japan

[73] Assignee: Canon Kabushiki Kaisha, Tokyo, Japan

[21] Appl. No.: 693,815

[22] Filed: Jan. 22, 1985

Related U.S. Application Data

[63] Continuation of Ser. No. 397,879, Jul. 13, 1982, abandoned.

[30] Foreign Application Priority Data

Jul. 20, 1981 [JP] Japan .................. 56-114074
Jul. 20, 1981 [JP] Japan .................. 56-114075

[51] Int. Cl.[4] .................................. G02B 27/28
[52] U.S. Cl. .................................. 350/405; 350/394; 350/407
[58] Field of Search .............. 350/394, 404–405, 350/407, 401; 358/55

[56] References Cited

U.S. PATENT DOCUMENTS 3,430,048  2/1969  Rubinstein .................. 350/401
3,463,575  8/1969  Gates ......................... 350/394
3,536,375  10/1970  Mansell ...................... 350/401
3,563,635  2/1971  DeLang ....................... 358/55
3,675,986  7/1972  Yamamoto et al. ............ 350/405

OTHER PUBLICATIONS

Francon et al., "Polarization Interferometers", Wiley-Interscience, pp. 3-8.
Nye, J. F., "Physical Properties of Crystals", Oxford at the Clarendon Press, 1957, pp. 235-238.
Van Doorn et al., "Optical Systems for Plumbicon Color Broadcast Cameras", Jr. of the SMPTE, 10–1976, pp. 1002-1006.

Primary Examiner—William H. Punter
Attorney, Agent, or Firm—Toren, McGeady, Stanger, Goldberg & Kiel

[57] ABSTRACT

A picture taking optical system for a color video camera of the frequency dividing type in which a half mirror for automatic focus detection and a double refraction plate for use as an optical low pass filter are in proper relation to prevent a reduction in the performance of the low pass filter.

2 Claims, 6 Drawing Figures

PICTURE TAKING OPTICAL SYSTEM FOR COLOR VIDEO CAMERA

This is a continuation of application Ser. No. 397,879, filed July 13, 1982, now abandoned.

BACKGROUND OF THE INVENTION

1. Field of the Invention

This invention relates to an optical system for a video camera of the frequency dividing type using a half mirror and a low pass double refraction filter in a portion of the picture taking optical system.

2. Description of the Prior Art

Up to now, in many video cameras, (a half mirror has been used) for automatic focus detection and an optical low pass, double refraction filter has been used in part of their picture taking optical systems. The pickup tube or solid state imaging element (hereinafter called "pickup tube, etc.") in the video camera is arranged so that the plane, containing the incidence-normal of the half mirror for the on-axis ray of light of the picture taking optical system and the optical axis of the picture taking optical system, is either parallel or perpendicular to the horizontal scan line of the pickup tube, etc. For this reason, the finder system, for example, was disposed just above or just beside the video camera. In general, the half mirrors in which the semi-transparent coating may be of metal or dielectric material have different transmission ratios for different components of the incident light on the semi-transparent coating, or P component and S component of the polarized light. On the other hand, a property of the double refraction plate is that an incident ray, when emerging is separated into ordinary and extraordinary rays. The video camera utilizes this property and uses the double refraction plate as an optical low pass filter. Therefore, if the incidence ratios of the P and S components of the light incident upon the double refraction plate differ from each other, the transmission ratios of the ordinary and extraordinary rays of the emerging light also differ from each other. Accordingly, the double refraction plate cannot perform to its utmost ability as an optical low pass filter.

Attempts have been made to eliminate such drawbacks by using a correction plate in front of the double refraction plate as proposed in Japanese Patent No. Sho 54-9499. However, the use of the additional optical element necessitates angularization and also reduces the entire optical system transmittance. Therefore, this method is not desirable.

When the picture taking optical system uses the optical low pass filter in the form of a double refraction plate, mention may also be made of those disclosed in U.S. Pat. No. 3,588,224, Japanese Laid Open Patent No. Sho 51-130116, and Japanese Utility Model Nos. Sho 47-18688, 47-18689 and 47-18690.

SUMMARY OF THE INVENTION

It is an object of the present invention to provide a picture taking optical system for a video camera which prevents performance reduction of a double refraction plate as the optical low pass filter due to unbalance of the transmission ratios of the P and S components resulting from the use of a half mirror in part of the picture taking optical system, and in which a false color signal based on the confusion of the spatial frequency of the scene to be picked up and color carrier frequency, are removed.

To achieve this, the half mirror is so oriented that the normal incidence of the half mirror for the on-axis ray of the picture taking optical system and the optical axis of the picture taking optical system define a plane that is about 45° with respect to the principal axis of the double refraction plate used as the optical low pass filter. The term "principal axis" is the direction in which the normal ray and the extraordinary ray separate.

In actual practice, when the principal axis of the double refraction plate is coincident with the horizontal scanning direction of the pickup tube, etc., the half mirror is so oriented that the plane defined by the normal reflection of the half mirror for the on-axis ray of the picture taking optical system and the optical axis of the picture taking optical system make an angle of about $(45+90n)$ where $n=0, 1, 2, 3$ with the horizontal scanning direction of the pickup tube, etc.

On the other hand, when the plane defined by the normal reflection of the half mirror for the on-axis ray of the picture taking optical system and the optical axis of the picture taking optical system is perpendicular to the horizontal scanning direction of the pickup tube, etc., the orientation is such that the principal axis of the double refraction plate used as the optical low pass filter makes an angle of $(45+90n)°$ where $n=0, 1, 2, 3$ with the horizontal scanning direction of the pickup tube, etc.

Here it is preferred to use a quartz uniaxial crystal, calcite or similar material as the double refraction plate.

DETAILED DESCRIPTION OF THE PREFERRED EMBODIMENTS

Figure 1:
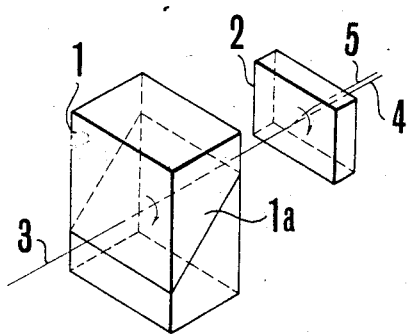
FIG. 1 is a perspective view of part of an optical system in the conventional video camera.

FIG. 1 illustrates an optical arrangement of a half mirror 1 and a double refraction plate 2 in the conventional video camera. A semi-transparent surface is identified by the reference numeral 1a. Light passed through the half mirror includes P and S components in different transmission ratios, taking the flux of light to the automatic focus detector or the finder in either of the directions of vertical and horizontal cross-sections, no matter which method may be employed. Therefore, light passes through the double refraction plate 2 with different transmission ratios for an ordinary ray 4 and an extraordinary ray 5 so that it becomes impossible to produce the best optical low pass filter performance.

In the present invention, performance reduction is prevented by arranging the double refraction plate 2 in such a position that its principal axis makes an angle of about 45° with respect to the plane containing the reflected ray of the on-axis ray, off the half mirror 1 and the optical axis 3.

Figure 2:
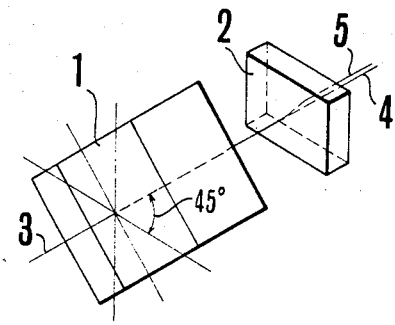
FIGS. 2 and 3 are perspective views of parts of optical systems of respective embodiments of the invention.

FIG. 2 illustrates an embodiment of the invention applied to an optical arrangement where the half mirror is oriented relative to the double refraction plate when its principal axis is coincident with the horizontal scanning direction of the pickup tube, etc.

This orientation is obtained by turning the half mirror 1 from the position of FIG. 1 to a direction indicated by an arrow so that the plane defined by the normal reflection of the half mirror 1 for the on-axis ray and the optical axis 3 makes an angle of about 45° with respect to the horizontal scanning direction of the pickup tube, etc. It should be pointed out that when the half-mirror is turned 90° from the standard position, the transmission ratios of the P and S components are converted. Therefore it is easily understood that when turned 45°, there is an occasion when the P and S components are equal to each other. In such a situation the transmission ratios of the ordinary ray 4 and the extraordinary ray 5 separated by the double refraction plate 2 become equal to each other, thus permitting the double refraction plate 2 to give its best performance as an optical low pass filter.

Figure 3:
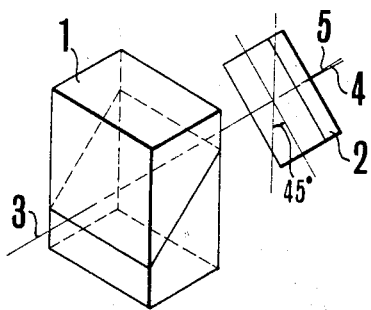

FIG. 3 illustrates another embodiment of the optical arrangement according to the present invention where the double refraction plate, serving as the optical low pass filter, is oriented relative to the half mirror when the plane defined by the normal reflection of the half mirror for the on-axis ray of the picture taking optical system and the optical axis of the picture taking optical system is perpendicular to the horizontal scanning direction of the pickup tube, etc. In the same drawing, the double refraction plate 2 is arranged so that its principal axis makes an angle of $(45+90n)°$ where $n=0, 1, 2, 3$, with respect to the scanning direction of the pickup tube, etc.

Figures 4, 5:
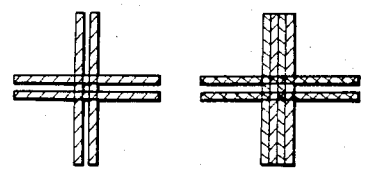
FIG. 4 illustrates an object to be picked up in the form of two crosses superimposed on each other.
FIG. 5 illustrates a blurred image of the object by the optical low pass filter of the double refraction plate arranged according to the prior art.
Figure 6:
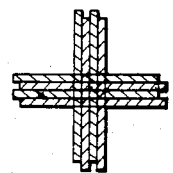
FIG. 6 illustrates a blurred image of the object by the optical low pass filter of the double refraction plate according to the embodiment of the invention.

If the object of the form illustrated in FIG. 4 is picked up by a video camera having the conventional optical arrangement, a picture which is blurred only in the horizontal directions, as illustrated in FIG. 5, is obtained. According to the present invention, a picture which is blurred uniformly in the vertical and horizontal directions as illustrated in FIG. 6 is obtained, provided that its blurring is $1/\sqrt{2}$ as large as the conventional one. To obtain an equivalent blurring amount to the conventional one, the thickness of the double refraction plate has to be $\sqrt{2}$ times as large as the conventional one.

It is to be noted that production of the vertically and horizontally blurred image is not very favorable to the type of system in which the color signals are separated by the frequency of the horizontal scanning direction as with the pickup tube. Upon consideration of the resolution limit of the TV scanning lines and the degree of resolution of the monitor, this order of blurring is actually found to be allowable.

On the other hand, in the solid state imaging element, it is preferred from the standpoint of preventing beat jamming that the blurring take place in both directions.

It is to be noted that though the half mirror 1 and the double refraction plate 2 when inclined to 45° have the best result, inclination to a range of 30° to 60° most of the objects of the present invention.

It is to be further noted that when either the half mirror 1 or the double refraction plate 2 is made freely rotatable and when mechanism is provided for adjusting the angular position of the rotatable mirror or plate, the object of the present invention is more advantageously accomplished.

As has been described above, according to the embodiments of the present invention, without using an additional optical member, the turned arrangement of the half mirror or double refraction plate can easily improve the performance of the optical low pass filter, thus achieving a picture taking optical system for a video camera which gets rid of a false color signal based on the confusion of the spatial frequency of the scene and on color carrier frequency which is picked up.

What I claim:
1. A camera for electrically detecting an image formed by an objective lens, comprising:
   splitting means for splitting light from said objective lens, said splitting means having a semi-transparent surface;
   low pass filter means to which a portion of the light from said objective lens is directed through said splitting means, said low pass filter means having a double refraction plate for splitting ordinary and extraordinary rays in a direction of a principal axis; and
   the angle the principal axis of said double refraction plate makes with a plane containing a perpendicular to said semi-permeable surface and an opitcal axis of said objective lens being larger than 30° but smaller than 60°.
2. A camera according to claim 1, wherein said angle is substantially 45°.

* * * * *